Oct. 30, 1951 J. S. ADKINS ET AL 2,572,827
NONTUMBLING GYROSCOPIC DIRECTIONAL INDICATOR
Filed March 8, 1948 2 SHEETS—SHEET 1

INVENTORS.
JOHN S. ADKINS
JOHN J. HART
BY Wade Trout
ATTORNEY and
Charles L. Burgoyne,
AGENT

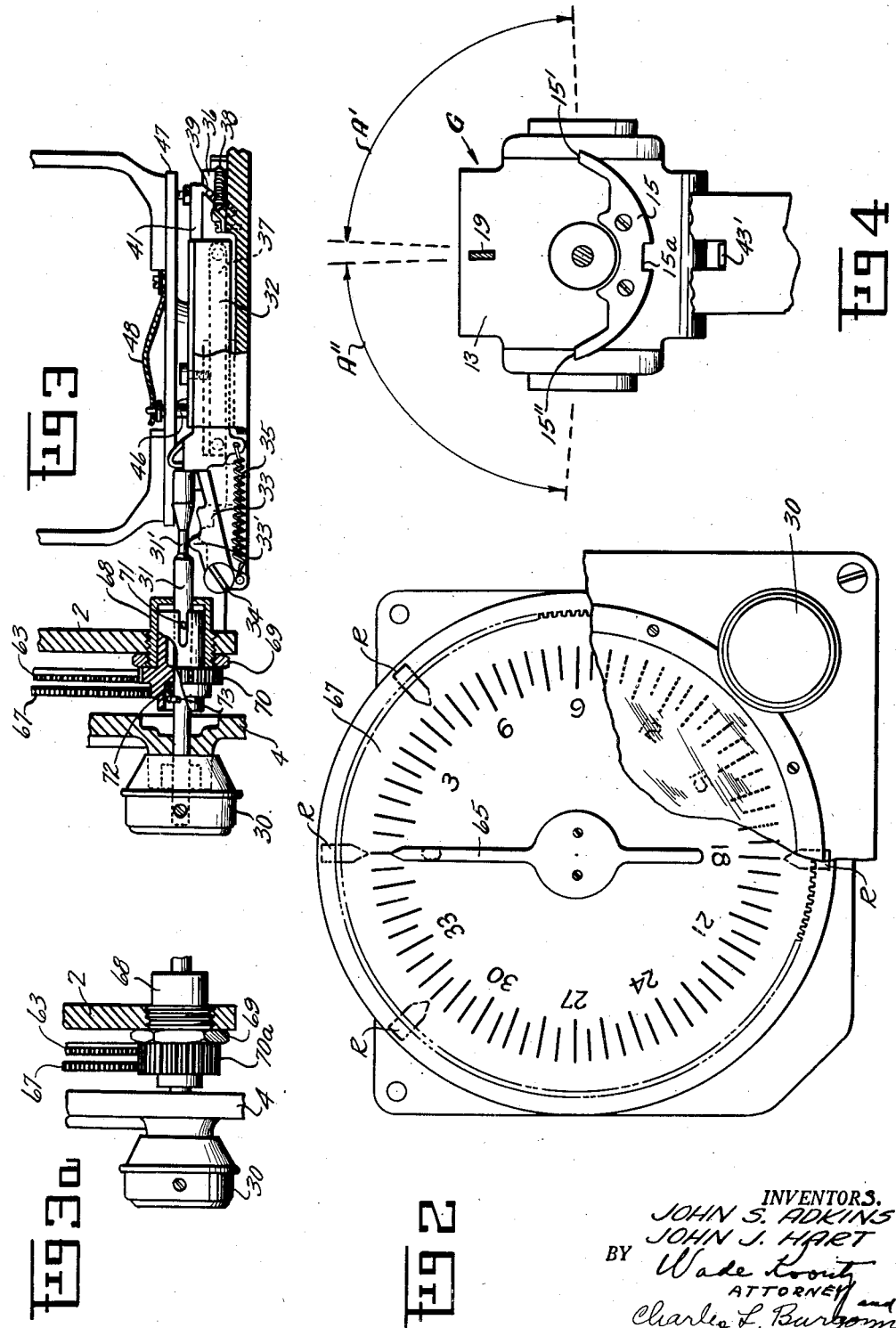

Patented Oct. 30, 1951

2,572,827

UNITED STATES PATENT OFFICE 2,572,827

NONTUMBLING GYROSCOPIC DIRECTIONAL INDICATOR

John S. Adkins, Dayton, and John J. Hart, Osborn, Ohio

Application March 8, 1948, Serial No. 13,734

3 Claims. (Cl. 33—204)

(Granted under the act of March 3, 1883, as amended April 30, 1928; 370 O. G. 757)

The invention described herein may be manufactured and used by or for the United States Government for governmental purposes without payment to us of any royalty thereon.

The present invention relates to a nontumbling gyroscopic directional indicator including a settable reference dial.

The primary object of the present invention is to provide a gyroscopic directional indicator especially suited for use on pursuit aircraft or on any aircraft which are highly maneuverable. Because of the maneuvers executed by such aircraft, the directional gyroscope is often subject to haphazard gyrations, so that upon completion of the maneuvers the heading indicated may be seriously in error. Thus it is an important object of the invention to so arrange the gyroscope gimbal ring and stop means therefor that unusual maneuvers will produce a definite and limited tumbling action of the gyroscope and so result in a minimum of deviation of the indicator.

Another object of the invention is to provide a directional gyroscope for aircraft including an indicating pointer for showing the instant aircraft heading in conjunction with a settable reference dial. The pointer and dial arrangement makes possible a directional indicator wherein the desired heading may be indicated when the pointer is in some arbitrary position, such as pointing vertically upward. This is desirable in standardizing an instrument since this arbitrary "straight up" pointer position is now an accepted condition in all types of aircraft instruments. Such a position of all the pointers of an instrument board is intended to show that the aircraft is operating satisfactorily.

A further object of the invention is to provide an improved caging mechanism for a gyroscopic indicator.

A further object of the invention is to improve the structural arrangement of elements in and extend the field of usefulness of gyroscopic directional indicators. A related object is to provide a gyroscopic directional indicator having reliable and predictable operating characteristics.

The above and other objects of the invention will become apparent upon reading the following detailed description in conjunction with the drawings, in which:

Fig. 2 is a front elevation view of the dial and pointer as used on the present directional indicator.

Fig. 3 is a detail view, partly in vertical cross section, the caging mechanism of the gyroscope.

Fig. 3a is a detail view of a portion of the mechanism shown in Fig. 3, but illustrating a modification of the caging mechanism.

Fig. 4 is a vertical cross sectional view taken on the line 4—4 of Fig. 1 to shown the angular range of movement of the gyroscope rotor and enclosing case therefor within the mounting ring or gimbal ring.

Figure 1:
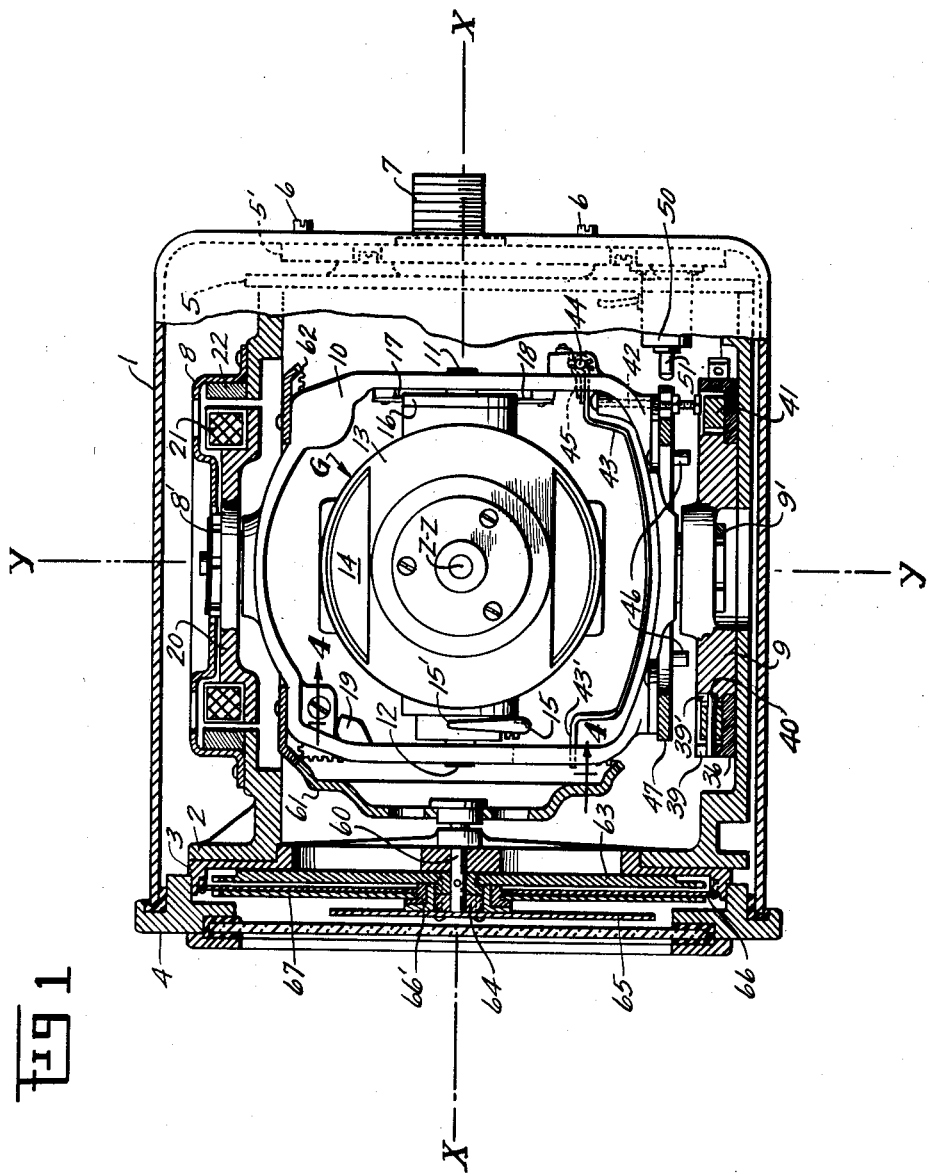
Fig. 1 is a vertical cross sectional view of the gyroscopic directional indicator, showing the essential elements contained within the outer shell or casing.

The presently disclosed gyroscopic directional indicator or directional gyroscope is of the electrically operated type, similar in this and other respects to the directional gyroscope described and illustrated in U. S. Letters Patent No. 2,406,341 granted to Lennox F. Beach et al. on August 27, 1946. The detailed arrangements for making electrical connections to the vertical mounting ring and to the rotor assembly being shown in the patent, these specific details are not illustrated in the present drawings. In any case it is well understood that electrical connections to rotating elements must be made through suitable slip rings or insulated pivots engaged by relatively stationary spring brushes.

BASIC GYROSCOPE ASSEMBLY

For a description of the present indicator reference is made to Fig. 1, wherein the complete device is shown except for portions of the gyro caging mechanism. The indicator includes a casing or housing 1 and attached frame assembly 2, both of box-like shape. At the front end of the frame assembly there are the dial supporting member 3, and the crystal supporting member 4. At the rear end of the frame assembly there are a pair of plate-like members 5 and 5' and to the latter members there is secured the casing 1 by means of screws 6. The front end of the casing is in abutment with gasket material forming part of the crystal supporting member 4. Secured to the back plates 5 and 5' there is a special electrical outlet 7, which includes prongs to supply all the needed electrical energy for operation of the gyro rotor and electromagnetic gyro erecting means. The preferred source of power on aircraft is the usual 115 volt, 400 cycle three-phase inverter, the outlet 7 thus requiring three prongs.

The frame assembly 2 includes a top bearing plate 8 and a bottom bearing plate 9 secured in any suitable manner, as by means of screws for instance. Antifriction bearings 8' and 9' centrally located on these plates provide means to rotatably mount the gimbal ring 10 on an axis y—y which is normally vertical, that is with the aircraft in level flight position. The opposite vertical side portions of the ring 10 are provided with antifriction bearings to mount trunnions 11 and 12 of the gyro assembly G. The gyro assembly G is thus mounted for free rotation on the normally horizontal axis x—x. The gyro assembly G comprises a cylindrical case or housing 13 within which is rotatably mounted a gyro rotor 14, the normally horizontal axis of which is indicated at z—z. The gyro assembly G forms a small induction motor, the case 13 being the stator, and the rotor 14 enclosed therein having sufficient mass to give the desired gyroscopic stability at high rotative speeds. Such a rotor tends to maintain itself in space with the axis in the same relative position at all times, this characteristic of gyro-stability and the further characteristic called precession being the principal operating features of all gyroscopes. Fixed on the left hand end of the case 13 there is a sector-like caging bar 15, the profile of which is well illustrated in Fig. 4. Fixed on the right hand end of the case 13 there is a leveling switch member 16 resembling a two-section commutator, only one of which sections may be seen in Fig. 1. The circuits through the switch are closed by means of spring arm brushes 17 and 18 located 180 degrees apart. The leveling switch 16, 17, 18 is open as long as the axis z—z is at a right angle with respect to the plane of the vertical gimbal ring 10. Variations in this angular relation either way from the neutral position shown in Fig. 1 will complete a circuit to a torquer (described below) to precess the gyro assembly G back to the neutral position. In the neutral position the spring arm brushes 17 and 18 contact only a pair of narrow insulating segments between the two semi-circular segments of the commutator-like switch member 16, the electrical circuit to the torquer thus being open. The opposite end portions 15' and 15" of the bar 15 are adapted to contact a stop member 19 secured to the gimbal ring 10 coincident with the central plane thereof. The range of movement allowed by the bar and bar stop may vary from about 82 to 89 degrees either way from the normal position of Fig. 1, but the preferred amount of angular movement is 86 degrees. This angle of rotation of the gyro assembly G will be referred to in more detail below but it is noted that Fig. 4 illustrates the normal spaced relation of the bar and bar stop. The angles of rotation of the gyro assembly in either direction are designated by the arcs A' and A" in Fig. 4. The bar 15 is also notched at 15a to receive the free end of a pivoted caging arm to be described below.

The vertical gimbal ring 10 rotatably mounted to turn about the axis y—y has rigidly mounted thereon at the upper side a torque rotor 20 including rotor windings 21. Mounted on the frame assembly 2 within the confines of the bearing plate 8 is a squirrel cage 22, which reacts electromagnetically with the rotor 20 to provide a torque action on the gimbal ring 10. This torque produces a precessing couple adapted to influence the relative position of the gyro assembly G about the x—x axis, since the couple is applied to the gimbal ring of the gyroscope in a plane lying at a right angle to the plane of rotation of gyro assembly G. The theory of precession is described in some detail in "The Theory of the Gyroscopic Compass" by A. L. Rawlings (second edition—1944). Power connections are made to the torquer 20, 21, 22 through the leveling switch 16, 17, 18. The torquer having a winding 21 capable of reversing the direction of torque by proper connections thereto, the switch 16, 17, 18 is thus adapted to reverse the torquing action of the torquer as the gyro assembly G tilts to one side or the other from the normal position (Figs.

1 and 4). The torque 20, 21, 22 is merely an induction motor and if there is a circuit thereto completed through the leveling switch when the gyro rotor 14 is not spinning, the torque will operate to spin the gimbal ring 10 about the axis y—y. However with the instrument in use the gyro rotor 14 is spinning rapidly and its gyroscopic stability effectively resists displacement of the gyro assembly G and also the gimbal ring 10 from the normal position. Application of power to the torquer thus acts merely to precess the assembly G back to its normal position in which no current passes through the leveling switch or the torquer.

CAGING MECHANISM

The gyro assembly G is caged or locked in the normal position (Figs. 1 and 4) when the caging mechanism is actuated. This mechanism will now be described starting with the caging knob 30 (Fig. 3). Fixed to the knob by a set screw there is a caging shaft 31 slidably and rotatably mounted in the crystal supporting member or face plate 4. The inner end of the shaft 31 contacts a caging slide 32 movably mounted on the base of frame assembly 2. A detent member 33 pivotally mounted on the frame assembly at 34 is spring-urged upwardly by means of a coil spring 35 connected to the detent below the pivot point 34. The opposite end of the spring 35 is secured to caging slide 32 which is thus urged toward the shaft 31 at all times. The end of slide 32 adjacent to the detent 33 has a turned in contact face portion which in the uncaged position retains the detent in the lower dotted line position. When the slide 32 reaches the inner position as shown under pressure exerted through shaft 31, the detent 33 snaps up to the full line position to prevent return of the slide 32. At the same time further upward movement of the detent is prevented by contact of the projection 33' with a reduced portion 31' of shaft 31. To release the detent and caging slide the shaft 31 is pulled outwardly to cam the detent downwardly, thus releasing the caging slide 32 for forward movement.

Rotatably mounted on the base of frame assembly 2 there is a cam ring 36 (see Fig. 1), which is turned about its center by the caging slide 32. The connection between the slide and ring may be in the form of gear teeth as shown in the patent to Beach et al. referred to above, but it is preferred to use a strip of flexible sheet metal 37 having opposite ends secured to the slide and ring respectively. The cam ring 36 is urged to the uncaged position by a coil spring 38, connected to lugs on the frame assembly and ring. The ring 36 has formed in its edge flange three or more cam slots 39 to receive a similar number of cam pins 40 secured in an annulus 41. The inner ends of the pins 40 extend into vertical slots 39' in the bearing plate 9, so that the annulus 41 must rise as the cam ring 36 is rotated. This construction may also be seen in the patent to Beach et al. previously identified (see Figs. 1, 2 and 3 of the patent). As the annulus 41 rises pressure is exerted on a push rod 42 having its upper end in engagement with a caging arm 43 pivotally mounted at 44 and spring urged downwardly. The free end 43' of the arm is adapted to contact the caging bar 15 and rock the bar and gyro assembly into the normal position whereupon the arm engages the notch 15a of bar 15 to retain the gyro assembly G in the normal caged position, as in Figs. 1 and 4. As may be seen in Fig. 4 the caging bar 15 has a circular outline with the center of curvature thereof being spaced above the axis of rotation of the rotor case so that pressure exerted by the caging arm will always rotate the bar and rotor case to the normal caged position. The caging elements such as the slide 32, ring 36, annulus 41, push rod 42 and arm 43 are all retained in the caged position by virtue of the detent 33, and if the detent is released by return movement of shaft 31 all the foregoing elements return to their uncaged position by virtue of springs acting individually thereon. The spring for arm 43 is a small leaf spring 45 bearing on the arm near the pivot 44, the downward return of the arm being adapted to return the push rod 42 to the lower position of Fig. 1. As the annulus 41 rises it is also adapted to engage the under face portions of pins 46 slidably mounted in a ring 47 carried on the lower side of gimbal ring 10. These pins 46 are urged downwardly by leaf springs 48 secured on the ring 47. With the annulus 41 in the raised position, the contacting relation of the annulus 41 and the pins 46 causes frictional locking of the gyroscope gimbal ring 10 with respect to its normal rotation about the axis $y$—$y$. The operation of caging the gyroscope as just described is done to temporarily stabilize the instrument and to positively set the gyro assembly G in the normal position, wherein the axis $y$—$y$ is at a right angle to the axis $z$—$z$.

The ring 47 also serves another purpose besides that of carrying the friction pins 46. Mounted on the plate 5′ adjacent to the ring 47 there is a small solenoid 50 having a spring-projected armature 51. The armature is adapted to contact the outer edge of ring 47 when the circuit to the solenoid is broken, thus frictionally locking the gimbal ring 10 against free rotation about the $y$—$y$ axis. The solenoid 50 is connected in series with the windings of gyro rotor 14, so that when the power to the instrument is cut off the armature 51 will instantly apply a braking force to the ring 47. Upon landing the aircraft the power supply is usually turned off, and power to the gyroscope is thus cut off. As the rotor 14 runs down it may cause tilting of the gyro assembly G and rotation of the gimbal ring 10, if the automatic solenoid brake is not present. Therefore the solenoid as described forms a convenient stabilizing adjunct in the instrument. It might be noted further that the caging mechanism is never left in "set" position when the aircraft is on the ground, since this would place strains on the bearings particularly in taxiing the aircraft over the ground.

SETTABLE DIAL AND POINTER

The instrument includes a dial supporting member 3 as noted above. Extending centrally through the member 3 is a drive shaft 60 having rigidly secured thereto a large bevel gear 61. Meshing with gear 61 is another bevel gear 62 fastened to the top of the gimbal ring 10 coaxially with respect to the axis $y$—$y$ (see Fig. 1). Thus the rotation of gimbal ring 10 about the $y$—$y$ axis results in rotation of the shaft 60. Pinned to the shaft 60 is a gear wheel 63, and secured centrally to the gear wheel is a hub 64 carrying a pointer 65. Secured to the member 3 is circular plate 66 having a central hub portion 66′, within which is rotatably mounted the pointer hub 64. The central hub portion 66′ carries a flange and between this flange and the plate 66 there is mounted a circular dial or card 67 having peripheral gear teeth thereon. The card 67 turns on the hub portion 66′ but always remains in any selected position due to friction between the card and its central mounting means.

As shown in Fig. 3 the shaft 31 extends through a cup-like bushing 68 threaded into the frame 2 and locked in position by means of a nut 69. Seated in the bushing is the hub portion of a gear member 70, through which the shaft 31 extends. The shaft 31 may slide in the bushing but relative rotation therebetween is prevented by engagement of a cross-pin 71 on the shaft which rides in a slot formed in the hub of gear 70. Limited relative sliding movement is also possible but the shaft tends to take a definite position with respect to the gear hub due to a coil spring 72 in the hub which is engaged by a cross-pin 73 on the shaft 31. Thus the spring forces the shaft outwardly until the cross-pin 71 engages the outward end of the slot associated therewith. Further outward movement of the shaft caused by a pull on knob 30 carries the gear 70 outward into driving engagement with the gear teeth of card 67. As shown in Fig. 3 the gear 70 is in driving engagement with gear 63, which is directly connected to the pointer 65. The driving gear or pinion 70 stays in this position while the gyroscope is caged, even though the shaft 31 does spring outward slightly after manual pressure is taken off the knob 30. The driving gear 70 is moved into engagement with the peripheral teeth on card 67 at the same time the gyroscope is uncaged by an outward pull on knob 30. Thus in the normal uncaged operation of the instrument, the reference dial or card 67 may be set with reference to the pointer. For instance, if a turn of a known magnitude is to be executed the card 67 may be rotated through a known angle with respect to the pointer, and upon completion of the turn the pointer will read zero on the card thus informing the pilot that he has completed the turn. In the caged position of the gyroscope, the pointer may be set independently of the card so as to place the pointer in a straight up position opposite one of the fixed reference marks R. Then when the gyroscope is uncaged the on course position of the pointer will be in the preferred straight up position, since the gyro assembly G tends to hold to its original position because of the principle of gyroscopic stability. As seen in Fig. 2 there are several reference marks or indices R located around the dial in fixed relation to the crystal supporting member 4. There are preferably two indices R in vertical alignment, and two more each at forty-five degrees from the uppermost index.

A modification of the dial and pointer drive means is shown in Fig. 3a. In this form of the gear drive, the card and pointer may be moved together when the gyroscope is caged but when it is uncaged only the card 67 may be moved just as in the principal form of the invention (Fig. 3). As shown in Fig. 3a the slidable and rotatable shaft 31, having a knob 30 secured thereto, extends through the crystal supporting member 4 and also through the hollow bushing 68. Mounted on the shaft in a manner similar to the mounting of gear 70 in Fig. 3 there is a gear 70a having teeth wide enough to drive both the card 67 and the gear 63 at the same time. However when the shaft 31 is pulled out to the uncaged position, the gear 70a will mesh only with the card 67, for adjustment thereof with respect to the pointer 65.

GYROSCOPE FUNCTIONS AND OPERATION

The purpose of the present gyroscopic indicator is to show the instant heading of an aircraft having the indicator mounted in front of the pilot with the dial in plain view facing toward the rear of the aircraft. With the aircraft on an even keel, the instrument case I will extend horizontally and the y—y axis will extend in a vertical direction. However the x—x axis extending through trunnions 11 and 12 and the z—z axis (known as the spin axis of the gyroscope) will extend horizontally in various directions while maintaining the fixed right angular relation with respect to each other. With a change in heading of the aircraft, the absolute direction of the z—z axis will not change. Therefore the gimbal ring 10 will stay in a relatively fixed position while the frame assembly 2 turns around with the aircraft. This relative motion of the frame and gimbal ring will cause displacement of the pointer 65 an amount equivalent to the change in the aircraft heading, due to the action of bevel gears 61 and 62.

The manner of operation of the reference dial 67 and its relative position with respect to the pointer 65 may be varied according to personal preference of the pilot but the preferred manner of use will be described as follows. With the aircraft proceeding on course in normal level flight the gyroscope is caged manually and while caged the knob 30 is turned to position the pointer 65 in the uppermost position. The gyro assembly G will now be in the normal position with the axis z—z in a horizontal attitude, and when the gyroscope is uncaged by pulling out the knob 30 the assembly G as well as the gimbal ring 10 will hold the same position as obtained while the caging mechanism was set. Now the knob 30 is again rotated to set the card 67 in position where the dial reading corresponds to the indicated heading obtained from the magnetic compass or other direction indicator. Within the limits of accuracy of any gyroscope, the pointer 65 will now hold the same heading as long as the aircraft is maintained on the set course. Any deviation of the aircraft from the straight ahead course will be reflected in a shift of the pointer 65 in one direction of rotation or the other, thus warning the pilot that he has wandered off his desired heading. A return to the correct heading will of course return the pointer to the original position.

For illustration assume that the aircraft is heading north, as indicated by the zero setting of Fig. 2. Now assuming that it is desired to head the aircraft in a northeast direction, the pilot will operate the rudder to turn to the right at the same time watching the pointer 65 as it turns clockwise. When the pointer reaches a point 4.5 on the card 67 the pilot knows the turn is complete and he can keep the pointer on this setting for a northeast heading. If he is going to hold this course for some distance he may cage the gyroscope and turn the pointer to the uppermost position opposite one of the indices R (see Figs. 3 and 3a.) Then he will immediately uncage the gyroscope and again turn the knob 30 to bring the graduation 4.5 on card 67 opposite the pointer and uppermost index R. Now if he keeps the pointer in the straight up position by proper manipulation of the rudder he is assured of being on course in a northeast direction. It is noted however that if the construction of Fig. 3a is used, the pointer and card will turn together in the caged position of the shaft 31 and gear 70a, thus making unnecessary the separate rotation of the card 67 after uncaging the gyroscope as required with the construction of Fig. 3. In making a turn as explained above the aircraft will be banked during the turn, which will mean that the spin axis z—z will stay horizontal but the normally vertical axis y—y will take a position corresponding to the angle of bank, or roll. As long as the bank does not reach an angle which allows the caging bar 15 to strike the stop 19, the normal relation of the axes will be restored as the aircraft returns to a trim level position. If the gimbal ring is in position to place axis z—z near the fore-and-aft axis of the aircraft, the axis z—z may hold its horizontal position without any appreciable relative rotation of the gyro assembly G relative to the gimbal ring 10 (about the x—x axis). The whole gyroscope assembly will merely turn about the z—z axis, which axis is now coincidental with the bank axis of the aircraft. Of course the z—z axis is generally somewhere between the position of Fig. 1 and the fore-and-aft position, so there is usually some relative movement of the gyro assembly G and the gimbal ring 10 during a banked turn. It might be mentioned in passing that a bank or banked turn which does produce such relative displacement of the assembly G and the gimbal ring 10 will connect the torquer 20—21—22 to the power supply through action of leveling switch 16—17—18, but the aircraft is back in level flight so soon that the torquer will not have time to effect any appreciable change in the relative position of the axes z—z and y—y. For most turns and maneuvers the effect of the torquer may be ignored, its purpose as noted before being to maintain the right angular relation of axes z—z and y—y during normal level flight. The reasons for maintaining the spin axis z—z horizontal in normal flight are beyond the scope of the present description, but the reasons are well stated in "The Theory of the Gyroscopic Compass" by A. L. Rawlings (second edition—1944), pages 16 to 23.

In understanding the operation of the gyroscope with reference to its non-tumbling characteristics during violent maneuvers of the aircraft, it must be emphasized that the axis z—z will rarely if ever extend directly transverse of the instrument and aircraft as shown in Fig. 1, nor directly in a fore-and-aft direction either but may approximate these positions at times. It must also be emphasized that the roll and pitch maneuvers on modern fighter aircraft are often very extreme. For instance a normal turn for an aircraft flying at 500 miles per hour may result in a 90° bank angle. At times the aircraft may roll through 360° while on a more or less straight course, and during combat operations almost any combination of roll and pitch maneuvers may be effected by the pilot. On coming out of such maneuvers it is highly desirable that the directional indicator show the relative direction of flight, just as though the aircraft had been in level flight during the time of these maneuvers. The manner in which the present instrument accomplishes this objective will now be set out.

Case I.—Roll maneuvers

Considering the instrument in the position of Fig. 1, a roll of the aircraft will cause the frame assembly 2 and the gimbal ring 10 to rotate around the relatively fixed gyro assembly G. If the magnitude of the roll is less than the angle A' or A" (Fig. 4), the stop members 15 and 19 merely approach each other and on coming out of the roll into level flight the stop members separate again to once more assume the position of Figs. 1 and 4. If the magnitude of the roll is equal to or greater than the angle A' or A", the end portion 15' or 15" of the bar 15 will engage the stop member 19. The resulting reaction on the assembly G produces a precessing torque which is transferred to the gimbal ring 10 through the strap members 15 and 19 to cause a rotation of the ring about the axis y—y. As the axis z—z must approach the axis y—y however the precessing torque which develops upon contact of the stop members is reduced to a minimum and the consequent turning action of the gimbal ring at the larger bank angles is not so violent. The result is that when the stop members engage, the gimbal ring begins to turn rather slowly and after a 90° swing from the position of Fig. 1 the torque effect disappears, although the ring continues turning because of its inertia. Furthermore with the gyro assembly G still in horizontal position the leveling switch 16—17—18 is on, so that a very slight torque is now applied to the ring 10 by the torquer 20—21—22 which acts to dampen or retard the turning motion of the ring. The result of the stop arrangement disclosed and the torquer action is to prevent violent turning action of the gimbal ring in rolls of large angle (say 90° bank angle for example), and thus to prevent the gimbal ring from rotating rapidly about the axis y—y in an uncontrolled fashion. If the roll is completed to a 90° position with the ring 10 turned about 180° away from its original position the pilot usually comes back to level flight. The stop action between members 15 and 19 now comes into play immediately to cause a reverse torque on the gimbal ring 10 to return the ring toward its original position, and allow the stop members to separate as the gyro assembly G still holds to its original horizontal relation. The effect of this simple 90° roll on the pointer 65 is to cause its swing through 180° as the gimbal ring rotates a like amount, and its return in the opposite direction of swing to the original position as the aircraft is maneuvered back into level flight. It should be mentioned that the bevel gears 61 and 62 are of the same size, so that any angle of swing of the gimbal ring about the axis y—y will be duplicated in the angle of swing of the indicator needle 65.

Assume now that the simple roll of about 90° as above described is combined with a turn of about 90° or less. The roll will probably be executed before any rudder is applied to prevent a possible skid of the aircraft. Thus as before the stop members 15 and 19 will contact and the ring 10 will start to turn as though it was touched lightly by hand. By the time the ring 10 has been displaced through an appreciable angle (say about 90°), the turn of the aircraft will be well started and the banked turn will proceed. However on completion of the turn when the aircraft starts out of the steep bank, the stop members may not contact again to swing the gimbal ring back as in the simple roll. Instead the contact members will swing apart because the turn has caused the ring 10 to take a new position more or less transverse to the fore-and-aft axis of the aircraft, instead of lined up therewith as shown in Fig. 1. The pointer 65 will of course come to a stop so as to show the exact angle of turn completed or the new heading. Even if the stop members do give the return motion to ring 10 as in the case of a simple roll, the ring will not swing violently or with an uncontrollable speed and in any case the gyro assembly G always has time to come away from the stop engaging relation at the right time, instead of being whirled along with the mounting ring and probably coming back to a stable position later with the instrument pointer showing an erroneous heading.

As a second example of the roll condition, consider the spin axis z—z extending along the fore-and-aft axis of the aircraft. Now in a simple roll of any magnitude the whole gyroscope assembly merely rotates around the rotor 14 and no relative movement of the assembly G and ring 10 occurs. Of course if a turn is executed at the same time the axis z—z will leave this fore-and-aft position and then the roll will act on the instrument just about in the same manner as outlined above for such a combined maneuver.

*Case II.—Pitch maneuvers*

Considering the instrument in the position of Fig. 1, a pitch or loop of the aircraft will affect the gyroscope just the same as a roll where the axis z—z is in a fore-and-aft direction. That is the gyroscope frame, mounting ring and rotor case will merely rotate around the rapidly turning rotor 14 and no relative displacement of the gyro assembly G and mounting ring 10 will occur. As noted in the preceding paragraph however any turn at the same time will cause the axis of spin z—z to leave the transverse relation of Fig. 1, and then the ring 10 may turn far enough away from the relatively stationary gyro assembly G to cause engagement of the stop members 15 and 19 with consequent turning action of the ring 10 about the axis y—y, as explained above.

In a pitch or loop maneuver where the spin axis z—z is in a fore-and-aft position or close thereto, the performance of the instrument is exactly similar to the case in which a roll is executed with the axis z—z in the position of Fig. 1. A pitch of sufficient magnitude to cause the stop member 19 to swing against the bar 15 will bring about a swing of the gimbal ring 10. Since this operation has been stated above under Case I, it need not be repeated.

SUMMARY

The non-tumbling characteristics of the present gyroscopic directional indicator are due largely to the specific relation of the stop members 15 and 19, which permits relatively large movements of the gyro assembly G with respect to the gimbal ring 10 before any engagement of the stop members. After the stop members do engage the rotating action of the gimbal ring 10 about the axis y—y is not excessively violent, thus allowing the gyro assembly G to act independently in its effort to hold to the original fixed position in space. This position is determined by the action of the caging mechanism, although of course the orientation of the spin axis z—z in the horizontal plane is determined by the setting of the pointer 65. The pointer may be held at any reference point on the dial by maintaining a straight course of the aircraft, but for most purposes it is preferable to place the pointer in a straight up position for any extended flight. This makes a very convenient though arbitrary cruise position.

Because of the proximity of the angles A' and A" to a right angular relation it might be supposed that it would be preferable to allow a full 90° swing of the gyro assembly G relative to the gimbal ring 10. However this is not desirable since a coincidental relation of the axes z—z and y—y will result in rapid rotation of gimbal ring about the axis y—y. This is caused by the frictional drag effect of the gyro rotor 14 on its bearings in the rotor case 13, whereby the rotor tends to set the rotor case and the gimbal ring into rotary motion about the coincidental axes z—z and y—y. Besides this also produces a sort of dead-center relation of the gyro assembly G and the gimbal ring 10, requiring some very definite force to move the gyro assembly away from this so-called "gimbal locked" position. Thus the previously stated values of angles A' and A" are considered to be the most desirable. The range of these equal angles, as stated previously, should be at or somewhere between the values 82° and 89°. The preferred value of this angular relation is 86°. It is further noted that the card 67 is graduated in degrees from 0 to 360 like a compass card. However, to simplify the dial markings the numerals thereon omit the last zero, for instance 18 indicates 180°.

The embodiments of the invention herein shown and described are to be regarded as illustrative only and it is to be understood that the invention is susceptible to variations, modifications and changes within the scope of the appended claims.

We claim:

1. A gyroscopic directional indicator comprising, a normally vertical gimbal ring mounted to rotate freely about a normally vertical axis, a rotor case mounted to rotate within said gimbal ring about a normally horizontal axis of rotation, a rotor capable of high speed rotation being rotatably mounted within said rotor case on a normally horizontal spin axis lying at a right angle to the axis of rotation of said rotor case, a rotatably mounted direction indicating pointer, means for operatively connecting said gimbal ring and said pointer to provide for equi-angular rotation of said pointer and said gimbal ring, a rotatably mounted reference dial directly behind said pointer and concentric with respect thereto, a caging mechanism operable to positively move said rotor case into a position wherein said rotor spin axis is at a right angle to the axis of rotation of said gimbal ring, a slidable and rotatable shaft for actuating said caging mechanism by a sliding movement thereof, means including an element fixed on said shaft to rotate said pointer and said gimbal ring when said shaft is in the caged position and upon rotation of said shaft, and the latter means being operable to rotate said reference dial when said shaft is in the uncaged position and upon rotation of said shaft.

2. A gyroscopic directional indicator comprising, a normally vertical gimbal ring mounted to rotate freely about a normally vertical axis, a rotor case mounted to rotate within said gimbal ring about a normally horizontal axis of rotation, a rotor capable of high speed rotation being rotatably mounted within said rotor case on a normally horizontal spin axis lying at a right angle to the axis of rotation of said rotor case, a rotatably mounted direction indicating pointer, means for operatively connecting said gimbal ring and said pointer to provide for equi-angular rotation of said pointer and said gimbal ring, a rotatably mounted reference dial directly behind said pointer and concentric with respect thereto, a caging mechanism operable to positively move said rotor case into a position wherein said rotor spin axis is at a right angle to the axis of rotation of said gimbal ring, a slidable and rotatable shaft for actuating said caging mechanism by a sliding movement thereof, means including an element fixed on said shaft to simultaneously rotate said pointer and gimbal ring and also said reference dial by rotation of said shaft when the shaft is in the caged position, and the latter means being operable to rotate only said reference dial by rotation of said shaft when the shaft is in the uncaged position.

3. A gyroscopic directional indicator comprising, a normally vertical gimbal ring mounted to rotate freely about a normally vertical axis, a rotor case mounted to rotate within said gimbal ring about a normally horizontal axis of rotation, a rotor capable of high speed rotation being rotatably mounted within said rotor case on a normally horizontal spin axis lying at a right angle to the axis of rotation of said rotor case, a rotatably mounted direction indicating pointer, means for operatively connecting said gimbal ring and said pointer to provide for equi-angular rotation of said pointer and said gimbal ring, a rotatably mounted reference dial directly behind said pointed concentric with respect thereto and having gear teeth around the periphery thereof, a gear wheel having the same diameter as said reference dial mounted directly behind said dial and being rigidly connected to said pointer at the center thereof, a caging mechanism operable to positively move said rotor case into a position wherein said rotor spin axis is at a right angle to the axis of rotation of said gimbal ring, a slidable and rotatable shaft for actuating said caging mechanism by an inward sliding movement thereof, pinion means on said shaft engageable with said reference dial and said gear wheel simultaneously when said shaft is in the caged position thereof, and said pinion means being engageable only with said reference dial when said shaft is in the uncaged position thereof.

JOHN S. ADKINS.
JOHN J. HART.

REFERENCES CITED

The following references are of record in the file of this patent:

UNITED STATES PATENTS

| Number | Name | Date |
|---|---|---|
| 1,704,489 | Sperry | Mar. 5, 1929 |
| 1,992,970 | Sperry et al. | Mar. 5, 1935 |
| 2,052,866 | Carlson et al. | Sept. 1, 1936 |
| 2,099,705 | Reichel | Nov. 23, 1937 |
| 2,334,116 | Meredith | Nov. 9, 1943 |
| 2,395,250 | Carlson | Feb. 19, 1946 |
| 2,406,341 | Beach et al. | Aug. 27, 1946 |
| 2,441,307 | Alkan | May 11, 1948 |
| 2,452,473 | Kellogg | Oct. 26, 1948 |

FOREIGN PATENTS

| Number | Country | Date |
|---|---|---|
| 464,263 | Great Britain | Apr. 14, 1937 |
| 871,226 | France | Jan. 10, 1948 |